Dec. 29, 1953
C. BRADLEY
2,664,155
TIMING DEVICE
Filed Aug. 26, 1952
2 Sheets-Sheet 1
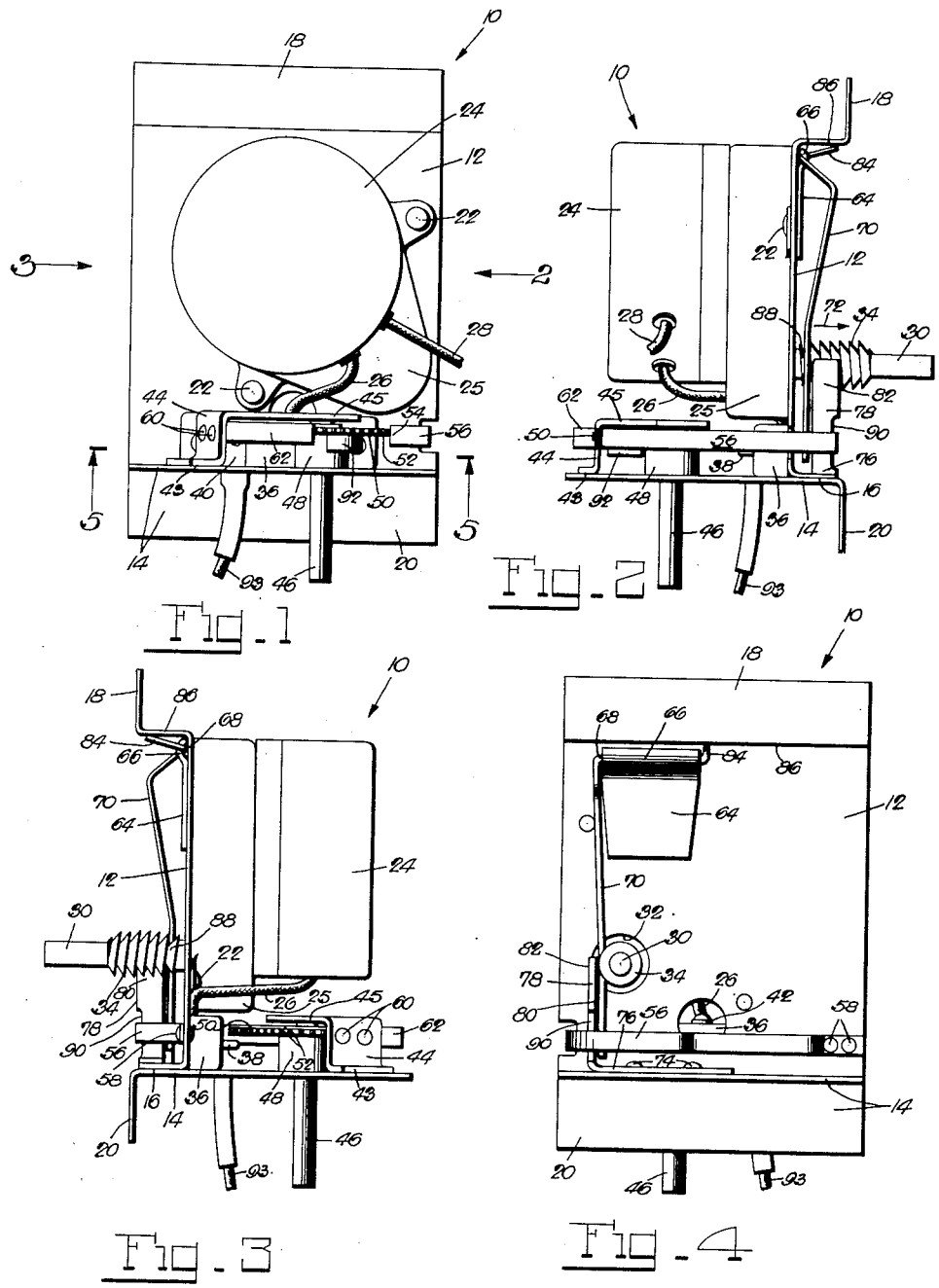
Inventor:
Caton Bradley
by Steward & Sprigel
Attorneys.

Inventor:
Caton Bradley
by Steward & Sprugel
Attorneys.

Patented Dec. 29, 1953

2,664,155

UNITED STATES PATENT OFFICE 2,664,155

TIMING DEVICE

Caton Bradley, Middletown, Conn., assignor to The Sessions Clock Company, Forestville, Conn., a corporation of Connecticut Application August 26, 1952, Serial No. 306,475

20 Claims. (Cl. 161—1)

This invention relates to timing devices in general, and to variable timing devices in particular.

It is an object of the present invention to provide a timing device of a type which relies for its timing function on the predetermined running time of an electric motor such as an alternating current motor of the synchronous type, for instance.

Another object of the present invention is to provide a timing device of this type in which each timing cycle is controlled by mechanism which is driven by the timer motor and automatically interrupts the circuit of this motor after a predetermined running period of the latter.

It is a further object of the present invention to provide a timing device of this type which is suited especially, though by no means exclusively, for timing the performance of a great variety of different apparatus which require for their performance or for the control thereover an electric circuit in which the instant timer motor and a switch may readily be interposed, so that the aforementioned motor-driven mechanism may at the end of each timing cycle actuate this switch and thereby not only interrupt the circuit of the timer motor but the operating or control circuit of the apparatus as well.

Another object of the present invention is to provide a timing device of this type which readily lends itself to timing the performance of other kinds of apparatus of which the prime mover may be the instant timer motor, in which case the motor shaft becomes the main drive shaft of the apparatus and a predetermined time cycle of operation of the apparatus will be concluded when the aforementioned motor-driven mechanism interrupts the circuit of the timer motor.

A further object of the present invention is to provide a timing device of this type which is presettable for varying its timing cycle by relatively small time increments so that the same may readily be adapted to apparatus requiring accordingly narrow time-cycle variation.

It is another object of the present invention to provide a timing device of this type which is presettable for varying its timing cycle not only by relatively small increments but within exceptionally wide overall time limits as well, so that the instant device is suitable for different apparatus having widely differing time-cycle requirements.

Another object of the present invention is to provide a timing device of this type of which the aforementioned switch is normally closed, and the motor-driven mechanism includes a movable member which at the conclusion of each timing cycle is automatically returned into a home position in which to open this switch, and which for each timing cycle is set or moved away from home position so that the setting of this member for the next timing cycle will immediately start not only the latter but also the operation of any apparatus with which the instant device is associated in any of the aforementioned ways.

It is a further object of the present invention to provide a timing device of this type of which the aforementioned movable member is settable at variable distances from its home position for according variation of the ensuing timing cycles thereof, and this member is operatively connected with the timer motor so that the same will be returned by the latter into its home position at the end of each timing cycle, or may quickly be returned manually into its home position to interrupt any timing cycle at any time if this should be necessary or desired.

It is another object of the present invention to provide a timing device of this type which is exceedingly simple, rugged and condensed in its construction, yet highly reliable and accurate in its performance over a long period of use, and which readily lends itself to efficient mass production at low cost.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a front view of a timing device embodying the present invention;

Figs. 2 and 3 are side views of the instant timing device as viewed in the directions of the arrows 2 and 3, respectively, in Fig. 1;

Fig. 4 is a rear view of the timing device;

Figure 5:
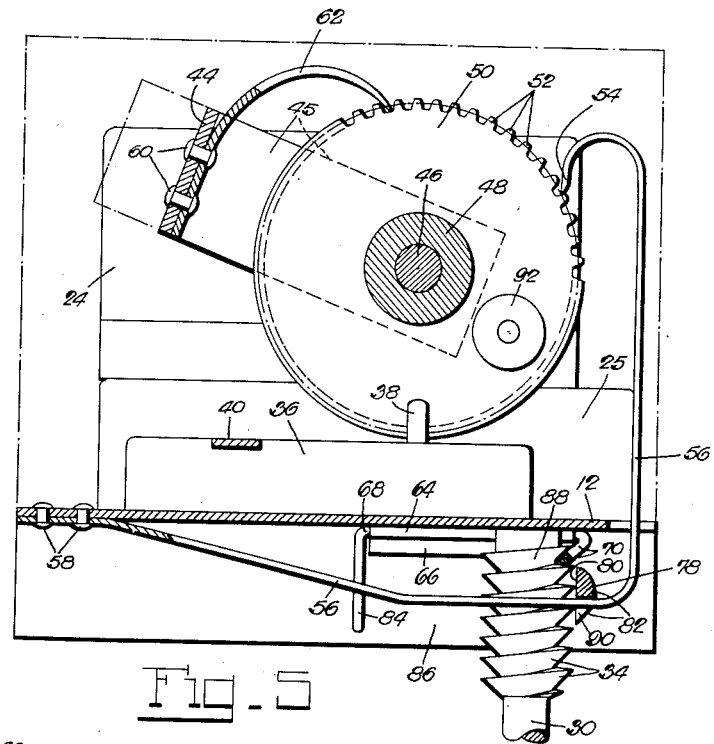
Fig. 5 is an enlarged section taken substantially on the line 5—5 of Fig. 1.

Referring to the drawings, and more particularly to Figs. 1 to 4 thereof, the reference numeral 10 designates a timing device of which the various operating parts are carried by a panel 12 and a base 14 which are suitably joined at 16, as by spot welding, for instance, and have flanges 18 and 20 for the convenient mounting of the timing device on any suitable support. Riveted or otherwise secured at 22 to the front of the panel 12 is an electric motor 24 which may, for instance, be a conventional self-starting synchronous motor having the leads 26 and 28 to and from the usual field winding of the motor. In this instance, the motor 24 has a reduction gearing encased at 25, and the output shaft of this reduction gearing is indicated at 30 and is hereinafter referred to as the "timer" shaft. The timer shaft 30 extends to the rear of the panel 12 through an aperture 32 therein (Fig. 4) and is provided with a screw-thread 34. The screw-thread 34 is, in the present instance, formed directly on the timer shaft 30.

Figures 6, 7:
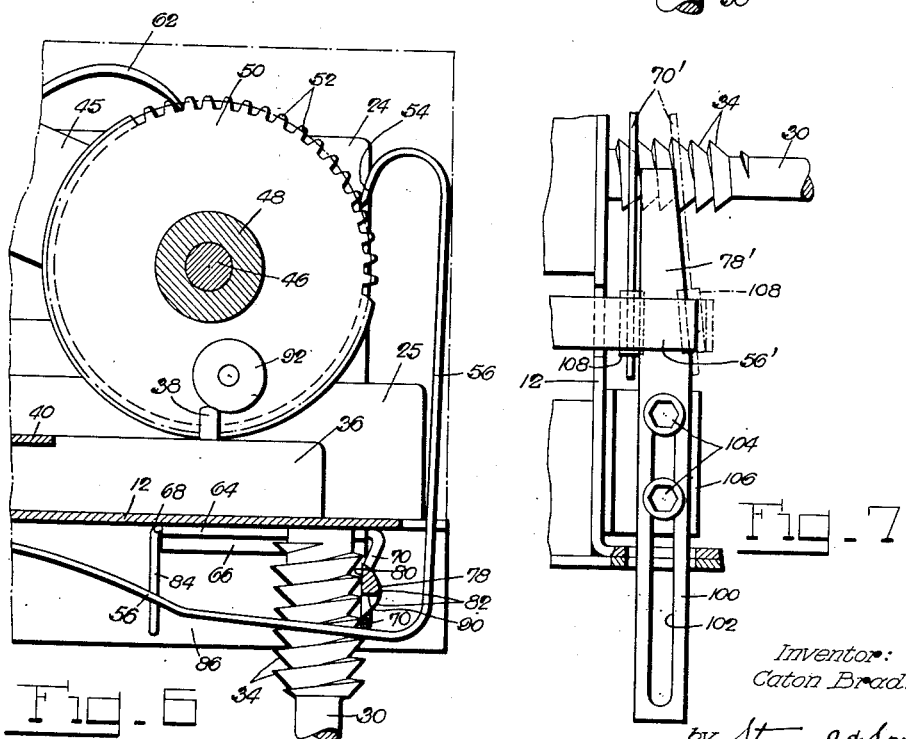
Fig. 6 is a fragmentary section similar to a part of Fig. 5, but showing certain operating parts at a different operating condition of the timing device.
Fig. 7 is an enlarged side view, partly in section, of a part of a timing device in which the present invention is embodied in a modified manner.

Suitably mounted on the front of the panel 12 is a snap switch 36, having a depressible element 38 for actuating the switch (see also Figs. 5 and 6). The switch 36 is provided with terminal tabs 40 and 42 (Figs. 1, 4 and 5) for the connection of the companion contacts, respectively, of the switch with leads to be described.

Suitably mounted at 43 on the base 14 is a bracket 44 having an arm 45 spaced from the base 14. Journalled in the base 14 and the arm 45 of the bracket 44 is a control shaft 46 on which is mounted the hub 48 of a ratchet disc 50 the teeth 52 of which may conveniently be in the form of gear teeth. Cooperating with the ratchet disc 50 is an indexing pawl 54 which in this instance is formed by an appropriately bent end of a leaf-type spring 56 which is anchored with its other end on the rear of the panel 12 as at 58 (Figs. 4 and 5). As will be described more fully hereinafter, the pawl end 54 of the leaf spring 56 is adapted to index the ratchet disc 50 in clockwise direction as viewed in Fig. 5. Riveted or otherwise secured at 60 to the bracket 44 is one end of another leaf-type spring 62 which is formed as shown in Fig. 5 and held in yielding engagement with the teeth of the ratchet disc 50 to serve as a holding pawl which prevents rotation of the ratchet disc opposite to its indexing direction.

Welded or otherwise secured to the rear of the panel 12 is an anchor plate 64 having an eye formation 66 in which is pivoted an intermediate bent portion 68 of a feed rod or element 70. The feed rod 70 is in this instance made of spring wire, and its pivot mounting is so arranged that the rod is normally yieldingly urged against the screw-thread 34 on the timer shaft 30. Furthermore, the lower end of the feed rod 70 is bent so as to extend transversely of the timer shaft 30 and be normally in registry or mesh with the screw-thread 34 thereon (Figs. 2 and 5).

The screw-thread 34 on the timer shaft 30 is, during normal running of the latter, adapted to feed the rod 70 from the starting position shown in Fig. 2 forwardly in the direction of the arrow 72 for some distance, whereupon the rod is permitted to disengage from the screw-thread 34 and return to its starting position for a repeat forward feed by the screw-thread 34. To this end, there is suitably mounted at 74 in back of the panel 12 a bracket 76 (Figs. 2 and 4) of which an upstanding leg serves as a rod-guide 78. One face 80 of the rod-guide 78 is flat and is in close proximity to an axial length of the screw-thread 34 (Figs. 4 and 5) in order positively to retain the rod 70 in feeding relation with this axial thread length. Accordingly, the rod 70 in its starting position (Fig. 2) will, on rotation of the timer shaft 30, be fed forwardly by the screw-thread 34 at least until the rod clears the adjacent face 80 of the guide 78 (Fig. 6). In the present instance, the width of the rod-guide 78 is such as to span three consecutive turns of the screw-thread 34, and the guide 78 is located in front of, but closely adjacent to, the starting position of the rod 70 (Figs. 2 and 5) to assure the unfailing feed of the rod through the axial extent of these three turns of the screw-thread after each return of the rod to its starting position.

For its return into starting position, the rod 70 is at the end of each feed stroke thereof biased rearwardly over the other or lead-back face 82 of the guide 78. To this end, a bent end 84 of the rod 70 bears against a panel wall 86 in the manner shown in Figs. 2 and 3 so as yieldingly to urge the rod 70 into its starting position in which the same bears against a flank 88 of one of the turns of the screw-thread 34, in this instance the one nearest the panel 12. It will also be observed from Figs. 2 and 3 that the restrained rod 70 will further be resiliently tensioned while passing through each feed stroke, so that the rod will assuredly jump or snap back into its starting position when clearing the face 80 of the guide 78 at the end of each feed stroke. The lead-back face 82 of the rod-guide 78 may be cam or wedge-shaped in a manner like or similar to that shown in Figs. 5 and 6, so that this face of the guide 78 will cam the yieldingly-urged rod 70 back to its starting position without offering any appreciable resistance to the same. While the rod 70 is normally yieldingly urged into meshing engagement with the screw-thread 34 as explained, the increasing tension in the rod during each feed stroke thereof is sufficient to counteract its tendency to remain in engagement with the screw-thread, and to withdraw the rod from the thread and retract it over the guide 78. Thus, the rod 70 will, while the motor 24 is running, have periodic feed strokes and quick return strokes, and the path of the rod is circuitous around the guide 78, as will be readily understood.

To facilitate the withdrawal of the rod 70 from the screw-thread 34 at the end of each feed stroke, the flank 88 of the screw-thread 34 which faces away from the panel 12 is preferably beveled as shown, so that this thread flank forms in fact a continuation of the lead-back face 82 of the rod-guide 78 (Fig. 6) and will offer as little resistance to the retraction of the rod as does the guide 78.

The feed rod 70 is adapted to actuate the indexing pawl 54 during each feed stroke thereof. To this end, the leaf-spring 56 is normally urged into the idle or home position shown in Figs. 2 and 5 in which the same extends into a notch 90 on the front side of the rod-guide 78. With this arrangement, the feed rod 70 will during the latter part of each feed stroke thereof displace the leaf-spring 56 from the position shown in Fig. 5 into that shown in Fig. 6, causing thereby the pawl 54 to index the ratchet disc 50, in this instance the distance of one tooth 52. Fig. 6 shows the rod 70 at the end of a feed stroke thereof, and in a position where it has just started its return stroke into starting position. As soon as the rod 70 is at the end of each feed stroke released by the guide face 80 for its retraction or reverse stroke into starting position, the leaf-spring 56 and the pawl end 54 thereof will yieldingly be returned into the idle position shown in Fig. 5, the holding pawl 62 meanwhile preventing reverse rotation of the ratchet disc 50, as will be readily understood.

The ratchet disc 50 carries a switch-actuator which in this instance is in the form of a roller 92 that is adapted to depress the switch element 38 and actuate the switch 36 when the ratchet disc arrives in a certain operative position. Thus, the ratchet disc 50 is in its illustrated position in Fig. 6 one indexing step away from this operative position, although the switch element 38 is already slightly depressed by the roller 92 but not sufficiently to actuate the switch 36. The actuation of the switch 36 will in any event terminate a timing cycle of the instant device regardless of the manner in which the latter is used for timing purposes.

The control shaft 46 preferably carries a convenient knob (not shown) by means of which to turn or preset the ratchet disc 50 for a selective timing cycle of the device. In this connection, it will be observed that the holding pawl 62 will prevent rotation of the ratchet disc 50 opposite to its indexing direction, but the pawls 62 and 54 are so arranged that they will never interfere with manual rotation of the ratchet disc in indexing direction. Thus, depending on the manual setting of the ratchet disc 50, i. e., the angular spacing of the roller 92 on the preset ratchet disc 50 from the switch element 38, the following timing cycle of the device will have an according duration. It is now obvious that the duration of any timing cycle of the device may be selected at will and within very considerable overall time limits.

In the present instance, the switch 36 is in series connection with the field coil of the motor 24 and is, accordingly, in the motor circuit. Thus, the motor lead 26 (Fig. 1) is connected to the terminal tab 42 of the switch 36 as shown in Fig. 4, and the other terminal tab 40 is connected to a lead 93 which forms part of the circuit of the motor 24. In this instance also, the snap switch 36 is normally closed, and is opened on depression of the switch element 38. Accordingly, a timing cycle of the device will have been concluded, and the motor 24 will also stop, when the ratchet disc 50 arrives in the hereinbefore mentioned operative position, rendering thereby the entire timing device idle. Furthermore, the described presetting of the ratchet disc 50 away from its operative position will also effect an immediate start of the motor 24 and, accordingly, immediate initiation of the next timing cycle of the device. Also, any started timing cycle of the device may, if necessary or desired, be interrupted immediately at any time by simply turning the ratchet disc 50 manually into its operative position.

The circuit of the motor 24 and timer switch 36 may readily be extended so as to be the operating or control circuit of an apparatus the operation of which is to be timed by the instant device. In that case, the entire operation of the apparatus may be under the final control of the instant device to the extent that mere presetting of the ratchet disc 50 will immediately initiate a timed operating cycle of the apparatus, and manual rotation of the ratchet disc at any time into its operative position will interrupt any started operating cycle of the apparatus.

If power factors permit, the timer shaft 30 of the instant device may also be used directly as the main drive shaft of other apparatus the operation of which is to be timed. Any secondary drive shaft or shafts of the apparatus could be driven at any desired speed from the timer shaft 30 through intermediation of suitable reduction or speed-up gearing, as the case may be.

While by no means limited to timing cycles of relatively long duration, the instant device is especially suited for relatively long timing cycles such as are used for driers, for instance. Considering, as an example only, that the prime mover 24 is a low-speed synchronous motor having additionally a reduction gearing, then each feed stroke of the rod 70 may take in the neighborhood of two minutes, for instance. If the ratchet disc 50 is sufficiently large to accommodate a very considerable number of teeth 52 of the right dimensions, it will be readily understood that the instant device would then be capable of timing cycles that may vary from a few minutes to over an hour or even hours.

An entirely different range or ranges of the possible timing cycles of the instant device may be added by making the rod-guide of varying width and providing for adjustable mounting of the the same so that portions thereof of differnt widths may be brought into operative relation with the threaded timer shaft 30. Fig. 7 shows an example of such an arrangement. Thus, a rod-guide 78' is at one side tapered so as to have minimum and maximum widths to span, in this instance, two and three turns, respectively, of the screw-thread 34 on the timer shaft 30. The rod-guide 78' has a rear shank 100 which is longitudinally slotted at 102 for the reception of mounting screws 104 in a bracket 106 on the panel 12. In the instance shown in Fig. 7, the rod-guide 78' is so adjusted that its minimum width is in operative relation with the threaded timer shaft 30, i. e. two turns of the screw-thread 34 are spanned by the rod-guide. However, the rod-guide 78' may be adjusted so that its maximum width is in operative relation with the threaded timer shaft 30, in which case three consecutive turns of the screw-thread 34 would be spanned by the rod-guide and each feed stroke of the rod 70' would accordingly require one and one-half times as much time as in the preceding example.

The taper of the rod-guide 78' is necessarily such that the feed stroke of the rod 70' is under the full control of the particular width of the rod-guide adjacent the threaded timer shaft 30 and is not interfered with by the rod-guide regardless of its adjustment. Further, since the leaf-spring 56', which provides the indexing pawl for the ratchet disc, is in this instance permitted normally to bear against the rod guide as shown, and in order that the rod 70' may on each feed stroke thereof displace the leaf-spring 56' sufficiently to accomplish and indexing step of the ratchet disc, the rod 70' is provided with a collar 108 which will engage and displace the leaf-spring 56' in good time before the rod reaches the end of its feed stroke.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a timing device, the combination of a power-driven screw-threaded spindle; a feed rod laterally movable transversely and longitudinally of said spindle and normally yieldingly urged against the screw thread into feeding relation therewith and also in a starting position thereon longitudinally of the spindle; a guide having opposite surfaces of which one surface extends from adjacent said starting position in close proximity to and along an axial length of the screw thread in the feeding direction of the rod to retain the latter in feeding relation with the screw thread throughout said length thereof, and the other surface is shaped to guide the yieldingly-urged rod back into said starting position on clearing said one guide surface at the end of each feed stroke; and means including a timer element for actuating the latter on each feed stroke of said rod.

2. The combination in a timing device as set forth in claim 1, in which said guide is substantially wedge-shaped so as gradually to cam the yieldingly-urged rod back into said starting position.

3. The combination in a timing device as set forth in claim 1, in which said rod is resilient and is pivoted remote from said spindle for rotation about an axis transverse to the spindle axis so that said rod is normally resiliently urged against the screw thread.

4. The combination in a timing device as set forth in claim 1, in which said rod is resilient, and there is further provided a support on which said rod is, near an end thereof remote from said spindle, pivoted for rotation about an axis transverse to the spindle axis so that said rod is normally resiliently urged against the screw thread, and said rod end bears against said support so that said rod is resiliently tensioned during each feed stroke thereof for its yielding return into said starting position.

5. The combination in a timing device as set forth in claim 1, in which the flank of the screw thread facing in the feeding direction of said rod is bevelled so as to guide the yieldingly-urged rod onto said other guide surface for its return into said starting position.

6. A timing device, comprising a power-driven screw-threaded spindle; a feed rod laterally movable transversely and longitudinally of said spindle and normally yieldingly urged against the screw thread into feeding relation therewith and also into a starting position thereon longitudinally of said spindle; a guide having opposite surfaces of which one surface extends from adjacent said starting position in close proximity to and along an axial length of the screw thread in the feeding direction of said rod to retain the latter in feeding relation with the screw thread throughout said length thereof, and the other surface is shaped to guide the yieldingly-urged rod back into said starting position on clearing said one guide surface at the end of each feed stroke; an operable control member; a ratchet disc having means for operating said control member in an operative position of said disc; and a pawl actuated by said rod on successive strokes thereof in one direction to index said disc step-by-step toward and into said operative position.

7. A timing device as set forth in claim 6, in which said pawl is actuated by said rod on successive feed strokes thereof.

8. A timing device as set forth in claim 6, in which said ratchet disc is manually turnable from said operative position into different positions remote therefrom for selective timing of the device.

9. A timing device as set forth in claim 6, further comprising a holding pawl to prevent rotation of said disc in a direction opposite to its indexing direction, and said disc is manually turnable in said indexing direction from said operative position into different positions remote therefrom for selective timing of the device.

10. A timing device as set forth in claim 6, in which said control member is an electric switch having a depressible element for actuating the switch, and said ratchet disc has a cam projection for depressing said switch element when said disc turns into said operative position thereof.

11. A timing device as set forth in claim 6, in which said guide extends longitudinally transverse to the spindle axis and has longitudinally spaced different widths to span correspondingly different axial lengths of the screw thread, and said guide is longitudinally adjustable to bring any one of its different widths into operative relation with the screw thread.

12. A timing device, comprising an electric motor; a screw-threaded spindle driven by said motor; a feed rod laterally movable transversely and longitudinally of said spindle and normally yieldingly urged against the screw thread into feeding relation therewith and also into a starting position thereon longitudinally of said spindle; a guide having opposite surfaces of which one surface extends from adjacent said starting position in close proximity to and along an axial length of the screw thread in the feeding direction of said rod to retain the latter in feeding relation with the screw thread throughout said length thereof, and the other surface is shaped to guide the yieldingly-urged rod back into said starting position on clearing said one guide surface at the end of each feed stroke; an electric switch having a depressible element for actuating the switch; a ratchet disc having a cam projection for depressing said switch element when said disc turns into an operative position; and a pawl actuated by said rod on successive strokes thereof in one direction to index said disc step-by-step toward and into said operative position.

13. A timing device, comprising an electric motor; a screw-threaded spindle driven by said motor; a feed rod laterally movable transversely and longitudinally of said spindle and normally yieldingly urged against the screw thread into feeding relation therewith and also into a starting position thereon longitudinally of said spindle; a guide having opposite surfaces of which one surface extends from adjacent said starting position in close proximity to and along an axial length of the screw thread in the feeding direction of said rod to retain the latter in feeding relation with the screw thread throughout said length thereof, and the other surface is shaped to guide the yieldingly-urged rod back into said starting position on clearing said one guide surface at the end of each feed stroke; a normally closed electric switch in the circuit of said motor, said switch having a depressible element for opening the switch; a ratchet disc having a cam projection for depressing said switch element when said disc turns into an operative position; and a pawl actuated by said rod on successive strokes thereof in one direction to index said disc step-by-step toward and into said operative position.

14. A timing device as set forth in claim 13, in which said motor is a synchronous alternating current motor.

15. A timing device as set forth in claim 13, in which said ratchet disc is manually turnable from said operative position into different positions remote therefrom for closure of said switch and selective timing of the device.

16. A timing device as set forth in claim 13, in which said ratchet disc is manually turnable from said operative position into different positions remote therefrom for closure of said switch and selective timing of the device, and is also manually turnable from any position into said operative position to open said switch at will.

17. A timing device as set forth in claim 13, further comprising a holding pawl to prevent rotation of said disc in a direction opposite to its indexing direction, and said ratchet disc is manually turnable in said indexing direction from said operative position into different positions remote therefrom for closure of said switch and selective timing of the device, and is also manually turnable in said indexing direction from any position into said operative position to open said switch at will.

18. A timing device, comprising a power-driven screw-threaded spindle; a feed rod laterally movable transversely and longitudinally of said spindle and normally yieldingly urged against the screw thread into feeding relation therewith and also into a starting position thereon longitudinally of said spindle; a guide having opposite surfaces of which one surface extends from adjacent said starting position in close proximity to and along an axial length of the screw thread in the feeding direction of said rod to retain the latter in feeding relation with the screw thread throughout said length thereof, and the other surface is shaped to guide the yieldingly-urged rod back into said starting position on clearing said one guide surface at the end of each feed stroke; an operable control member; a rotary gear disc having a multiplicity of gear teeth and being provided with means for operating said control member in an operative position of said disc; and a leaf-type spring anchored at one end and having its other end formed to serve as an indexing pawl for said gear disc, said spring being engaged and displaced by said rod on successive strokes thereof in one direction to cause said pawl end to index said gear disc step-by-step toward and into said operative position.

19. A timing device as set forth in claim 18, in which said spring is engaged and displaced by said rod on successive feed strokes thereof.

20. A timing device as set forth in claim 18, further comprising another leaf-type spring anchored at one end and having its other end formed to serve as a holding pawl for said gear disc to prevent rotation of the latter opposite to the indexing direction thereof.

CATON BRADLEY.

References Cited in the file of this patent

UNITED STATES PATENTS

| Number | Name | Date |
|---|---|---|
| 1,376,531 | Greenwood | May 3, 1921 |
| 2,106,042 | Stark | Jan. 18, 1938 |
| 2,224,593 | Brown et al. | Dec. 10, 1940 |
| 2,230,191 | Knight | Jan. 28, 1941 |